United States Patent [19]

Carpenter et al.

[11] Patent Number: 5,455,287
[45] Date of Patent: Oct. 3, 1995

[54] FOUNDRY MIXES CONTAINING A POLYETHER POLYOL AND THEIR USE

[75] Inventors: William G. Carpenter, Powell; William R. Dunnavant, Columbus, both of Ohio

[73] Assignee: Ashland Inc., Columbus, Ohio

[21] Appl. No.: 207,315

[22] Filed: Mar. 7, 1994

Related U.S. Application Data

[63] Continuation of Ser. No. 941,835, Sep. 8, 1992, abandoned.
[51] Int. Cl.$^6$ ........................................................ B22C 1/22
[52] U.S. Cl. .......................... 523/143; 523/142; 524/595; 528/76; 528/77; 528/85
[58] Field of Search ...................... 523/143, 142; 524/595; 528/76, 77, 85

[56] References Cited

U.S. PATENT DOCUMENTS 4,148,777  4/1979  LaBar et al. .............................. 523/143
4,358,570  11/1982  Tobinaga .................................. 525/456
5,132,339  7/1992  Carpenter et al. ....................... 523/143

Primary Examiner—Paul R. Michl
Assistant Examiner—John J. Guarriello
Attorney, Agent, or Firm—David L. Hedden

[57] ABSTRACT

This invention relates to foundry mixes which comprise a dry foundry aggregate and a polyurethane-forming foundry binder. The binder components include a polyether polyol component and an organic polyisocyanate component which is cured with a liquid tertiary amine catalyst. The foundry mixes are used to prepare foundry shapes made from foundry mixes by a no-bake process. The resulting foundry shapes are used to cast metal parts from ferrous and non ferrous metals.

15 Claims, No Drawings

FOUNDRY MIXES CONTAINING A POLYETHER POLYOL AND THEIR USE

TECHNICAL FIELD

This invention relates to foundry mixes which comprise a dry foundry aggregate, a polyurethane-forming foundry binder, and a liquid amine curing catalyst. The binder comprises a polyether polyol component and an organic polyisocyanate component. The foundry mixes are used to prepare foundry shapes made from foundry mixes by a no-bake process. The binders do not contain any free formaldehyde or phenol, and are preferably solventless and odorless, which results in less stress to the environment. The resulting foundry shapes are used to cast metal parts from ferrous and non ferrous metals.

BACKGROUND OF THE INVENTION

In the foundry industry, one of the processes used for making metal parts is sand casting. In sand casting, disposable foundry shapes (usually characterized as molds and cores) are made by shaping and curing a foundry mix which is a mixture of sand and an organic or inorganic binder. The binder is used to strengthen the molds and cores.

One of the processes used in sand casting for making molds and cores is the no-bake process. In this process, a foundry aggregate, binder, and liquid curing catalyst are mixed and compacted to produce a cured mold and/or core. In the no-bake process, it is important to formulate a foundry mix which will provide sufficient worktime to allow shaping. Worktime is the time between when mixing begins and when the mixture can no longer be effectively shaped to fill a mold or core.

A binder commonly used in the no-bake process is a polyurethane binder derived by curing a polyurethane-forming binder with a liquid tertiary amine catalyst. Such polyurethane-forming binders used in the no-bake process, have proven satisfactory for casting such metals as iron or steel which are normally cast at temperatures exceeding about 2500 degrees Fahrenheit. They are also useful in the casting of light-weight metals, such as aluminum, which have melting points of less than 1500 degrees Fahrenheit.

The polyurethane-forming binder usually consists of a phenolic resin component and polyisocyanate component which are mixed with sand prior to compacting and curing. Both the phenolic resin component and polyisocyanate component generally contain a substantial amount of organic solvent which can be obnoxious to smell and can create stress for the environment. Because of this, there is an interest in developing binders which do not require the use of organic solvents.

British Patent Specification 1 203 943 discloses a foundry binder which purports to be solventless, yet effective. The foundry molds and/or cores disclosed in this patent are prepared from a foundry mix consisting of a (1) a wet foundry aggregate and (2) a polyurethane-forming foundry binder comprising (a) a polyether polyol having a hydroxyl value above 200 milligrams of potassium hydroxide per gram of polyether polyol and a functionality of at least 2.5 (b) an organic polyisocyanate, and (c) an organo-metallic or amine catalyst. The foundry mix is compacted into a mold and allowed to harden until the mix has sufficient dimensional stability so that it can be removed from the mold.

The patent states that the amount of the water in the foundry aggregate is from 2 to 7% by weight based upon the weight of the foundry aggregate. The patent suggests that the water in the aggregate may contribute advantageously to an earlier attainment of dimensional stability in the foundry shape. It also states that excess polyisocyanate is desirable to compensate for the presence of water. The examples show an isocyanate index of 130.

The patent is otherwise rather indefinite. For instance the amount of the catalyst level is not given in any of the examples.

SUMMARY OF THE INVENTION

This invention relates to a foundry mix comprising as a mixture:
 (a) a dry foundry aggregate;
 (b) a polyurethane binder comprising:
  (1) a polyether polyol component; and
  (2) an organic polyisocyanate component; and
 (c) a catalytically effective amount of a liquid tertiary amine catalyst wherein components (1) and (2) are compatible with each other.

The invention also relates to the use of these foundry mixes in a no-bake process for preparing foundry shapes, and the use of these foundry shapes to cast metal parts.

The binders of the foundry mixes do not contain any free formaldehyde or phenol and preferably do not use solvents and thus are odorless, which creates less stress to the environment than conventional polyurethane-forming binders. The foundry shapes prepared with the binders also show good shakeout when used to make metal castings. Finally, the metal castings do not exhibit as much lustrous carbon as those made with many other commercial binders. This is significant because lower lustrous carbon results in reduced casting defects.

BEST MODE AND OTHER MODES OF PRACTICING THE INVENTION

The polyether polyols which are used in the polyurethane-forming foundry binders are liquid polyether polyols or blends of liquid polyether polyols having a hydroxyl number of from about 200 to about 600, preferably about 300 to about 500 milligrams of KOH based upon one gram of polyether polyol. The viscosity of the polyether polyol is from 100 to 1,000 centipoise, preferably from 200 to 700 centipoise, most preferably 300 to 500 centipoise. The polyether polyols may have primary and/or secondary hydroxyl groups.

These polyols are commercially available and their method of preparation and determining their hydroxyl value is well known. The polyether polyols are prepared by reacting an alkylene oxide with a polyhydric alcohol in the presence of an appropriate catalyst such as sodium methoxide according to methods well known in the art. Any suitable alkylene oxide or mixtures of alkylene oxides may be reacted with the polyhydric alcohol to prepare the polyether polyols. The alkylene oxides used to prepare the polyether polyols typically have from two to six carbon atoms. Representative examples include ethylene oxide, propylene oxide, butylene oxide, amylone oxide, styrene oxide, or mixtures thereof. The polyhydric alcohols typically used to prepare the polyether polyols generally have a functionality greater than 2.0, preferably from 2.5 to 5.0, most preferably from 2.5 to 4.5. Examples include ethylene glycol, diethylene glycol, propylene glycol, trimethylol propane, and glycerine.

Although not preferred, minor amounts of phenolic resin and/or amine-based polyols can be added to the polyether polyol. By minor amounts, it is meant that less that 30 weight percent of phenolic resin and/or amine-based polyol is added based upon the weight of the polyether polyol, usually less than 15 weight percent and preferably less than 5 weight percent, said weight percent based upon the weight of the polyether polyol component. If a phenolic resin is added to the polyether polyol, the preferred phenolic resins used are benzylic ether phenolic resins which are specifically described in U.S. Pat. No. 3,485,797 which is hereby incorporated by reference into this disclosure.

Although not preferred, organic solvents may be added to the polyether polyol component, particularly if a benzylic ether phenolic resin is used with the polyether polyol. The amount of solvent used is generally less than 30 weight percent, usually less than 15 weight percent, preferably less than 5 weight percent based upon the total weight of the polyether polyol component.

Other optional ingredients which may be added to the polyether include release agents and adhesion promoters, such as silanes described in U.S. Pat. No. 4,540,724 which is hereby incorporated into this disclosure by reference, to improve humidity resistance.

Organic polyisocyanates used in the organic polyisocyanate component, which act as a hardener, are liquid polyisocyanates having a functionality of two or more, preferably 2 to 5. They may be aliphatic, cycloaliphatic, aromatic, or a hybrid polyisocyanate. Mixtures of such polyisocyanates may be used. The polyisocyanates should have a viscosity of about 100 to about 1,000, preferably about 200 to about 600.

Representative examples of polyisocyanates which can be used are aliphatic polyisocyanates such as hexamethylene diisocyanate, alicyclic polyisocyanates such as 4,4'-dicyclohexylmethane diisocyanate, and aromatic polyisocyanates such as 2,4- and 2,6-toluene diisocyanate, diphenylmethane diisocyanate, and dimethyl derivates thereof. Other examples of suitable polyisocyanates are 1,5-naphthalene diisocyanate, triphenylmethane triisocyanate, xylylene diisocyanate, and the methyl derivates thereof, polymethylenepolyphenyl isocyanates, chlorophenylene-2,4-diisocyanate, and the like.

The polyisocyanates are used in sufficient concentrations to cause the curing of the polyether polyol when cured with the liquid amine curing catalyst. In general the isocyanate ratio of the polyisocyanate to the hydroxyl of the polyether polyol resin is from 1.25:1.0 to 0.75:1.0, preferably about 0.9:1.0 to 1.1:1.0, and most preferably about 1.0:1.0.

The polyisocyanate preferably contains a natural oil which may include unmodified natural oils as well as their various known modifications, e.g., the heat bodied airblown, or oxygen-blown oils such as blown linseed oil and soybean oil. They are generally classified as esters of ethylenically unsaturated fatty acids. Preferably the viscosity of the natural oil is from A to J on the Gardner Holt viscosity index, more preferably from A to D, and most preferably A to B. Preferably the acid value of the natural oil is from about 0 to about 10, more preferably about 0 to about 4, and most preferably about 0 to about 2 as measured by the number of milligrams of potassium hydroxide needed to neutralize a 1 gram sample of the natural oil.

The natural oils are used in an effective amount sufficient to improve the tensile strength of the foundry shapes made with the binders. This amount will generally range from about 1 percent by weight to about 15 percent by weight, most preferably about 2 percent to about 10 percent by weight, based upon the weight of the organic polyisocyanate. Representative examples of natural oils which are used in the isocyanate component are linseed oil including refined linseed oil, epoxidized linseed oil, alkali refined linseed oil, soybean oil, cottonseed oil, RBD Canola oil, refined sunflower oil, tung oil, and dehydrated castor oil.

Preferably used as the natural oil are purer forms of natural oils which are treated to remove fatty acids and other impurities. These purer forms of natural oils typically consist of triglycerides and less than 1 weight percent of impurities such as fatty acids and other impurities. Specific examples of these purer natural oils are purified linseed oils, such as Supreme Linseed Oil manufactured by Cargill Corporation, having an acid value of about 0.30 maximum and a viscosity of A and purified soybean oils such as refined soybean oil having an acid value of less than 0.1 and viscosity of A to B.

Drying oils, for example those disclosed in U.S. Pat. No. 4,268,425, may also be used in the polyisocyanate component. Drying oils may be synthetic or natural occurring and include glycerides of fatty acids which contain two or more double bonds whereby oxygen on exposure to air can be absorbed to give peroxides which catalyze the polymerization of the unsaturated portions.

Optional ingredients such as release agents and solvents may also be used in the organic polyisocyanate component.

Although not preferred, solvents may be used in the organic polyisocyanate component and/or polyether polyol. If solvents are used in either, those skilled in the art will know how to select them. Typical organic solvents which are used include aromatic solvents, esters, or ethers, preferably mixtures of these solvents. Generally, these solvents are used in amounts less than about 30 weight percent based upon the weight of the organic polyisocyanate component, preferably less than 5 weight percent.

The binder is preferably made available as a three package system with the polyether polyol component in one package, the organic polyisocyanate component in the second package, and the catalyst in the third package. When making foundry mixes, usually the binder components are combined and then mixed with sand or a similar aggregate to form the foundry mix or the mix can be formed by sequentially mixing the components with the aggregate. Preferably the polyether polyol and catalyst are first mixed with the sand before mixing the isocyanate component with the sand. Methods of distributing the binder on the aggregate particles are well-known to those skilled in the art. The mix can, optionally, contain other ingredients such as iron oxide, ground flax fibers, wood cereals, pitch, refractory flours, and the like.

The liquid amine catalyst is a base having a $pK_b$ value generally in the range of about 7 to about 11. The term "liquid amine" is meant to include amines which are liquid at ambient temperature or those in solid form which are dissolved in appropriate solvents. The $pK_b$ value is the negative logarithm of the dissociation constant of the base and is a well-known measure of the basicity of a basic material. The higher this number is, the weaker the base. The bases falling within this range are generally organic compounds containing one or more nitrogen atoms. Preferred bases are heterocyclic compounds containing at least one nitrogen atom in the ring structure.

Specific examples of bases which have $pK_b$ values within the necessary range include 4-alkyl pyridines wherein the alkyl group has from one to four carbon atoms, isoquinoline, arylpyridines such as phenyl pyridine, pyridine, acridine, 2-methoxypyridine, pyridazine, 3-chloro pyridine, quinoline, N-methyl imidazole, N-ethyl imidazole, 4,4'-dipyridine, 4-phenylpropylpyridine, 1-methylbenzimidazole, and 1,4-thiazine. Preferably used are bicyclic tertiary amines such as DABCO 33 LV and DBU sold by Air Products Company, and diethylenetriamine. The amines have boiling points of at least 100° C., most preferably at least 200° C.

In view of the varying catalytic activity and varying catalytic effect desired, catalyst concentrations will vary widely. In general, the lower the $pK_b$ value is, the shorter will be the worktime of the composition and the faster, more complete will be the cure. Solvents and any acidity present in added ingredients such as sand may affect the catalytic activity. In general, however, catalyst concentrations will be a catalytically effective amount which generally will range from about 0.5 to about 5.0 percent by weight of the polyether polyol, preferably 1.0 percent by weight to 3.0 percent by weight, most preferably 1.0 percent by weight to 2.5 percent by weight based upon the weight of the polyether polyol.

In a preferred embodiment of the invention, the catalyst level is adjusted to provide a worktime for the foundry mix of 3 minutes to 10 minutes, preferably 8 minutes to about 10 minutes, and a striptime of about 4 minutes to 12 minutes, preferably 9 minutes to about 10 minutes. Worktime is defined as the time interval after mixing the polyisocyanate, polyether, and catalyst and the time when the foundry shape reaches a level of 60 on the Green Hardness "B" Scale Gauge sold by Harry W. Dietert Co., Detroit, Mich. Striptime is time interval after mixing the polyisocyanate, polyether, and catalyst and the time when the foundry shape reaches a level of 90 on the Green Hardness "B" Scale Gauge.

In this preferred embodiment, the ratio of the isocyanate groups of the polyisocyanate to hydroxyl groups of the polyether polyol is preferably about 0.9:1.0 to about 1.1:1.0, most preferably about 1.0:1:0, the hydroxyl number of the polyether polyol is from about 200 to about 500, and the weight ratio of polyisocyanate to polyether polyol is from about 55:45 to about 45:55, preferably about 50:50. These parameters provide optimum worktime, striptime, and tensile properties.

Various types of aggregate and amounts of binder are used to prepare foundry mixes by methods well known in the art. Ordinary shapes, shapes for precision Casting, and refractory shapes can be prepared by using the binder systems and proper aggregate. The amount of binder and the type of aggregate used is known to those skilled in the art. The preferred aggregate employed for preparing foundry mixes is sand wherein at least about 70 weight percent, and preferably at least about 85 weight percent, of the sand is silica. Other suitable aggregate materials for ordinary foundry shapes include zircon, olivine, aluminosilicate, chromite sand, and the like.

In ordinary sand type foundry applications, the amount of binder is generally no greater than about 10% by weight and frequently within the range of about 0.5% to about 7% by weight based upon the weight of the aggregate Most often, the binder content for ordinary sand foundry shapes ranges from about 0.6% to about 5% by weight based upon the weight of the aggregate in ordinary sand-type foundry shapes.

The aggregate employed with the catalyzed binder in producing the foundry mix should be sufficiently dry so that a handleable foundry shape results after a worktime of 3 to 10 minutes and a strip time of 4 to 12 minutes. Generally the amounts of moisture in the aggregate is less than about 0.5 per cent by weight, preferably less than about 0.2 percent by weight, and most preferably less than about 0.1 percent by weight based on the weight of the sand.

EXAMPLES

The examples which follow will illustrate specific embodiments of the invention. These examples along with the written description will enable one skilled in the art to practice the invention. It is contemplated that many other embodiments of the invention will be operable besides those specifically disclosed.

In all of the examples, the test specimens, unless otherwise indicated, were produced by the no-bake process using DABCO 33 LV, a bicyclic tertiary amine sold by Air Products Company, as a 33 percent solution in dipropylene glycol. All parts are by weight and all temperatures are in °C. unless otherwise specified.

Unless otherwise indicated, the foundry mixes were prepared by first mixing WEDRON 540 sand with the polyether polyol and catalyst for about 2 minutes. Then the MONDUR MR was mixed with the mixture of sand, polyether, and catalyst for about 2 minutes. The amount of polyether polyol and polyisocyanate was such that the ratio of hydroxyl groups of the polyether polyol to isocyanato groups of the polyisocyanate was about 1:1 and the weight ratio of polyether polyol to polyisocyanate was about 50:50. The binder level and amounts of polyisocyanate and polyether, plus any other components are given in the tables which follow.

Measuring the tensile strength of the dog bone shapes enables one to predict how the mixture of sand and binder will work in actual foundry operations. Lower tensile strength for the shapes indicate that the polyether polyol and polyisocyanate reacted more extensively during mixing with the sand prior to forming foundry shapes, and thus were not suitable for forming foundry shapes.

The foundry shapes were stored 1 hour, 3 hours and 24 hours in a constant temperature room at a relative humidity of 50% and a temperature of 25° C. before measuring their tensile strengths. Unless otherwise specified, the tensile strengths were also measured on shapes stored 24 hours at a relative humidity (RH) of 100%.

The following terms were used in the examples:

MONDUR MR=an organic polyisocyanate commercially available from MILES, INC. having a functionality of 2.5 to 2.7.

PLURACOL POLYOL TP-440=a polyether polyol, sold commercially by BASF, having an OH value of 398, prepared by reacting propylene oxide with trimethyolpropane.*

RH=relative humidity.

SLO=Supreme Linseed Oil

ST=striptime.

WT=worktime.

O/W=on weight of.

BOS=based on sand.

*A specific example of another commercially available polyether polyol which is effective is MULTRANOL 9158 polyether polyol sold by Miles, Inc.

EXAMPLE 1 and COMPARATIVE EXAMPLES. A–F

Examples 1 and 2 are within the scope of the subject invention and were prepared with dry sand. Comparative Examples A–F are the same as Example 1 except varying amounts of moisture were added to the sand as indicated in Table I. Additionally, in Comparative Examples B and D, the isocyanate index was varied from 1:1 to 1.3:1 to correspond with the index shown in British Patent Specification 1 203 943.

The data in Table I indicate that the foundry mixes prepared with dry sand and solventless binders perform effectively. They further indicate that these same binders do not perform effectively on wet sand which is surprising in view of the teachings as shown in British Patent Specification 1 203 943. This indicates that there is a difference between the subject invention and the invention described in the British patent.

EXAMPLES 2 and 3

In Example 2, the procedure of Example 1 was repeated. Example 3 is a repeat of Example 2 except five weight percent of the MONDUR MR organic polyisocyanate was replaced with SLO, Supreme Linseed Oil. Obviously the weight ratio of polyisocyanate to polyether was affected by this addition. The weight ratio of polyether to polyisocyanate for Example 2 was 51.6/48.4 while the weight ratio for Example 3, the formulation containing the SLO, was 50.3/49.7. The results of the experiment are show in TABLE II. The experiments indicate that the tensile strengths of the test specimens are improved with the addition of the SLO.

TABLE I

EFFECT OF MOISTURE
Sand: 4000 g Wedron 540
Binder: 1.5% BOS
Catalyst: Dabco 33 LV, 1.5% o/w Polyol

| Example | Polyol | Isocyanate | NCO/OH Ratio | WT/ST (Min.) | Tensile strength, psi. 1 Hr. | 3 Hr. | 24 Hr. | 24 Hr. @ 100% RH | Remarks |
|---|---|---|---|---|---|---|---|---|---|
| 1 | Pluracol TP-440, 30.9 g. | Mondur MR, 29.1 g. | 1.0 | 7.5/10.5 | 309 | 302 | 239 | 45 | 0.0% water Control |
| A | Water, 200 g. Pluracol TP-440, 30.9 g. | Mondur MR, 29.1 g. | 1.0 | 100/>2 days | | Did not cure | | | 5% water BOS |
| B | Water, 200 g. Pluracol TP-440, 27.0 g. | Mondur MR, 33.0 g. | 1.3 | >2 days/>2 days | | Did not cure | | | 5% water BOS |
| C | Water, 80 g. Pluracol TP-440, 30.9 g. | Mondur MR, 29.1 g. | 1.0 | ~3 hrs./>1 day | | Did not cure | | | 2% water BOS |
| D | Water, 80 g. Pluracol TP-440, 27 g. | Mondur MR, 33 g. | 1.3 | ~3 hrs./>1 day | | Did not cure | | | 2% water BOS |
| E | Water, 8 g. Pluracol TP-440, 30.9 g. | Mondur MR, 29.1 g. | 1.0 | 8.5/15.5 | 0 | 11 | 4 | 0 | 0.2% water BOS |
| F | Water, 20 g. Pluracol TP-440, 30.9 g. | Mondur MR, 29.1 g. | 1.0 | 10/26 | | Did not cure | | | 0.5% water BOS |

TABLE II

ADDITION OF SUPREME LINSEED OIL TO THE ISOCYANATE
Sand: 4000 g Wedron 540
Binder: 1,5% BOS
Catalyst: Dabco 33 LV, 1.5% o/w Polyol

| Example | Polyol | Isocyanate | NCO/OH Ratio | WT/ST (Min.) | Tensile strength, psi. 1 Hr. | 3 Hr. | 24 Hr. | 24 Hr. @ 100% RH | Remarks |
|---|---|---|---|---|---|---|---|---|---|
| 2 | Pluracol TP-440, 30.9 g. | Mondur MR, 29.1 g. | 1.0 | 7.0/9.8 | 281 | 286 | 299 | 57 | Control |
| 3 | Pluracol TP-440, 30.2 g. | 95% Mondur MR + 5% SLO, 29.8 g. | 1.0 | 7.0/10.2 | 370 | 356 | 314 | 60 | |

EXAMPLES 4–6 and COMPARATIVE EXAMPLES G–I

Again the procedure of Example I was followed except the catalyst level was varied. These examples show the effect of catalyst levels on worktime and striptime. Table III indicates that, in order to obtain adequate worktime and striptime, the catalyst level must be from about 0.75 weight percent to about 2.25 weight percent based upon the total weight of the polyether polyol.

TABLE III

EFFECT OF CATALYST LEVEL
Sand: 4000 g Wedron 540
Binder: 1.5% BOS
Catalyst: Dabco 33 I.V

| | | | | | Tensile strength, psi. | | | | | |
|---|---|---|---|---|---|---|---|---|---|---|
| Example | Polyol | Isocyanate | Catalyst | WT/ST (Min.) | 30 Min. | 1 Hr. | 3 Hr. | 24 Hr. | 24 Hr. @ 100% RH | Remarks |
| G | Pluracol TP-440, 30.9 g. | Mondur MR, 29.1 g. | 0.5% o/w Polyol | 25/45 | 0 | 43 | 153 | 247 | 59 | |
| 4 | Pluracol TP-440, 30.9 g. | | 1.0% o/w Polyol | 14/23 | 30 | 258 | 215 | 308 | 39 | |
| 5 | Pluracol TP-440, 30.9 g. | Mondur MR, 29.1 g. | 1.5% o/w Polyol | 8.5/9.5 | 164 | 242 | 287 | 259 | 48 | Preferred Amount |
| 6 | Pluracol TP-440, 30.9 g. | Mondur MR, 29.1 g. | 2.0% o/w Polyol | 3.7/6.2 | 209 | 221 | 171 | 145 | 40 | |
| H | Pluracol TP-440, 30.9 g. | Mondur MR, 29.1 g. | 2.5% o/w Polyol | Cured during mixing | | | | | | |
| I | Pluracol TP-40, 30.9 g. | Mondur MR, 29.1 g. | 3.0% o/w Polyol | Cured during mixing | | | | | | |

COMPARATIVE EXAMPLES J–L

Comparative Examples J–L illustrate the effect of using polyether polyols with hydroxyl numbers outside the claimed range. VORANOL 230-660 polyether polyol, used in Comparative Examples J and K, is a trifunctional polyether polyol having a hydroxyl number of 660 and a viscosity of 850 cps. PLURACOL 726 polyether polyol, used in Comparative Example L, is a trifunctional polyether polyol having hydroxyl number of 55 and a viscosity of 420 cps.

The data in Table IV which follows indicates that these polyols are not effective in achieving the results demonstrated by the subject invention.

We claim:
1. A no-bake foundry mix consisting essentially of in admixture:
   (a) a foundry aggregate containing less than 0.2 percent by weight of moisture, said weight based upon the total weight of the foundry aggregate;
   (b) as the binder:
      (1) a polyether polyol having
         (i) a functionality greater than 2.0;
         (ii) a hydroxyl number of from about 200 to about 600; and
         (iii) a viscosity of from about 100 centipoise to about 1000 centipoise at 25° C.;
      provided that said polyether polyol component may contain less than 5 weight percent of hydroxyl containing materials selected from the group consisting of phenolic resins, amine-based polyols, and mixtures thereof, and further provided that said polyether resin may contain less than 5 weight percent of organic solvent, and
      (2) an organic polyisocyanate component, provided that said polyether resin may contain less than 5 weight percent of organic solvent, wherein (1) and

TABLE IV

EFFECT OF HYDROXYL VALUE
Sand: 4000 g Wedron 540
Binder: 1.5% BOS
Catalyst: Dabco 33 LV

| | | | Hydroxyl Value of Polyol | Weight Ratio PE/ISO | Catalyst Amount | WT/ST (Min.) | Tensile Strength, psi. | | | |
|---|---|---|---|---|---|---|---|---|---|---|
| Experiment | Polyol | Isocyanate | | | | | 1 Hr. | 3 Hr. | 24 Hr. | 24 Hr. @ 100% RH |
| J | Voranol 230-660, 100% 23.3 g | Mondur MR, 36.7 g | 660 | 39/61 | 1.5% o/w Polyol | 14/24 | 56 | 77 | 114 | 43 |
| K | Voranol 230-660, 100% 23.3 g | Mondur MR, 36.7 g | 660 | 39/61 | 3.5% o/w Polyol | 2/4 | 43 | 58 | 72 | 32 |
| L | Pluracol 726, 52.8 g. | Mondur MR, 7.2 g. | 55 | 88/12 | 2.0% o/w Polyol | 13/19 | 10 | 10 | 0 | |

PE = Polyether
ISO = Isocyanate
Voranol 230-660 is trifunctional
Pluracol 726 is trifunctional (2) are compatible with each other; and (c) from about 0.75 weight percent to about 2.25 weight percent, based upon the total weight of the polyether polyol, of a liquid tertiary amine catalyst, such that said foundry mix has a worktime from about 3 to 10 minutes and a striptime from about 4 to 12 minutes.

2. The foundry mix of claim 1 which is free of formaldehyde and phenol and wherein the polyether polyol has a hydroxyl number of 200 to 500, a functionality of from about 2.5 to about 4.0, and a viscosity of from about 300 centipoise to about 500 centipoise at 25° C.

3. The foundry mix of claim 2 wherein the tertiary amine catalyst is a bicyclic tertiary amine.

4. The foundry mix of claim 3 which is solvent free and wherein the amount of moisture in-the aggregate is less than about 0.1 weight percent based upon the total weight of the aggregate.

5. The foundry mix of claim 4 wherein the polyisocyanate is mixed with a natural oil.

6. The foundry mix of claim 5 wherein the tertiary amine catalyst is triethylenediamine.

7. The foundry mix of claim 6 wherein the natural oil is Supreme Linseed Oil.

8. A no-bake process for the fabrication of foundry shapes comprising the steps of:

(a) mixing a dry foundry aggregate with a bonding amount of up to about 10% by weight, based upon the weight of the aggregate, of a binder composition consisting essentially of:

(1) a polyether polyol having
 (i) a functionality greater than 2.0;
 (ii) a hydroxyl number of from about 200 to about 600; and
 (iii) a viscosity of from about 100 centipoise to about 1000 centipoise at 25° C.;
provided that said polyether polyol component may contain less than 5 weight percent of a hydroxyl containing material selected from the group consisting of phenolic resins, no more than 5 weight percent amine-based polyols, and mixtures thereof and further provided that said polyether resin may contain less than 5 weight percent of organic solvent is used in the polyether polyol component of the binder, and (2) an organic polyisocyanate, provided that said organic polyisocyanate may contain less than 5 weight percent of organic solvent, wherein components (1) and (2) are compatible with each other; and (c) from about 0.75 weight percent to about 2.25 weight percent, based upon the total weight of the polyether polyol, of a liquid tertiary amine catalyst, whereby said foundry mix has a worktime from about 3 to 10 minutes and a striptime from about 4 to 12 minutes, (b) introducing the foundry mix obtained from step (a) into a pattern;

(c) allowing the foundry mix to harden in the pattern until it becomes self-supporting; and (d) thereafter removing the shaped foundry mix of step (c) from the pattern and allowing it to further cure, thereby obtaining a hard, solid, cured foundry shape.

9. The process of claim 8 which is free of formaldehyde and phenol wherein the polyether polyol has a hydroxyl number of 200 to 500, a functionality of from about 2.5 to about 4.0, and a viscosity of from about 300 centipoise to about 500 centipoise at 25° C.

10. The process of claim 9 wherein the catalyst is a bicyclic tertiary amine.

11. The process of claim 10 wherein the binder is solvent free and the amount of moisture in the aggregate is less than about 0.1 weight percent based upon the total weight of the aggregate.

12. The process of claim 11 wherein the polyisocyanate is mixed with a natural oil.

13. The process of claim 12 wherein the bicyclic tertiary amine catalyst is triethylenediamine.

14. A foundry shape prepared in accordance with claim 8.

15. A foundry shape prepared in accordance with claim 13.

* * * * *